US012774958B2

(12) United States Patent
Haziza

(10) Patent No.: US 12,774,958 B2
(45) Date of Patent: Oct. 27, 2026

(54) APPARATUS FOR SENSITIVE FLUORESCENCE OPTICAL MEASUREMENT OF BIOLOGICAL PARAMETERS IN FREELY BEHAVING ANIMALS

(71) Applicant: The Board of Trustees of the Leland Stanford Junior University, Stanford, CA (US)

(72) Inventor: Simon Haziza, Sunnyvale, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 138 days.

(21) Appl. No.: 18/749,313

(22) Filed: Jun. 20, 2024

(65) Prior Publication Data

US 2024/0426754 A1 Dec. 26, 2024

Related U.S. Application Data

(60) Provisional application No. 63/522,044, filed on Jun. 20, 2023.

(51) Int. Cl.
*G01N 21/64* (2006.01)

(52) U.S. Cl.
CPC . *G01N 21/6402* (2013.01); *G01N 2021/6484* (2013.01)

(58) Field of Classification Search
CPC ....... G01N 2021/6484; G01N 21/6402; G01N 2021/6478; G01N 21/645
See application file for complete search history.

(56) References Cited

U.S. PATENT DOCUMENTS 6,392,241 B1 * 5/2002 Rushbrooke ....... G01N 21/6452 250/370.08
9,983,127 B2 * 5/2018 Liu ...................... G01N 21/474
10,292,592 B2 5/2019 Marshall
2010/0103676 A1 * 4/2010 Noeth .................... G02B 26/10 359/223.1
2018/0286631 A1 * 10/2018 Axelrod .................. H01J 37/04

OTHER PUBLICATIONS

Marshall et al., Cell-Type-Specific Optical Recording of Membrane Voltage Dynamics in Freely Moving Mice. Cell 167 (2016), 1650-1662.

Lerner et al. Intact-Brain Analyses Reveal Distinct Information Carried by SNc Dopamine Subcircuits. Cell. Jul. 30, 2015;162(3):635-47.

* cited by examiner

*Primary Examiner* — Tri T Ton

(57) ABSTRACT

An apparatus for fiber optic-based fluorescence sensing includes a laser for exciting fluorescence at a precisely defined modulation frequency, illumination path optical elements including an axicon lens to homogenize photon density and directionality and a dual static/dynamic diffuser to reduce speckle noise, a flexible optical fiber for propagating the excitation photons and receiving the emission photons from fluorescent proteins, detection path optical elements, a photodetector optically coupled to the detection path optical elements, and a signal processor electrically connected to the photodetector adapted to process signals indicative of the detected fluorescence signal.

5 Claims, 4 Drawing Sheets

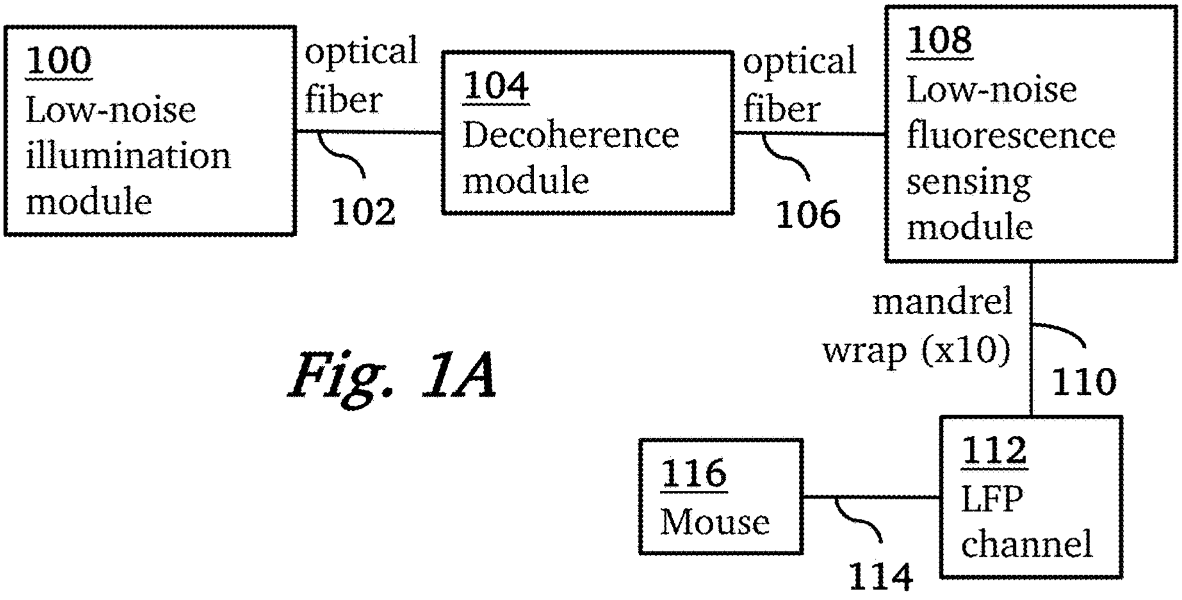
*Fig. 1A*
*Fig. 1B*
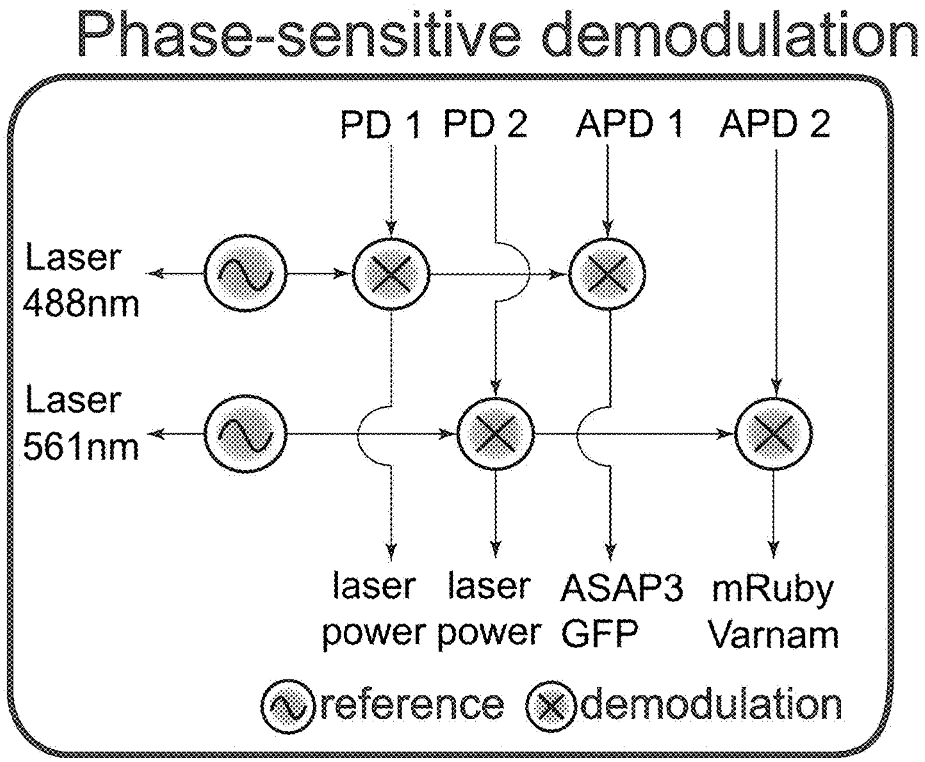

*Fig. 1C*
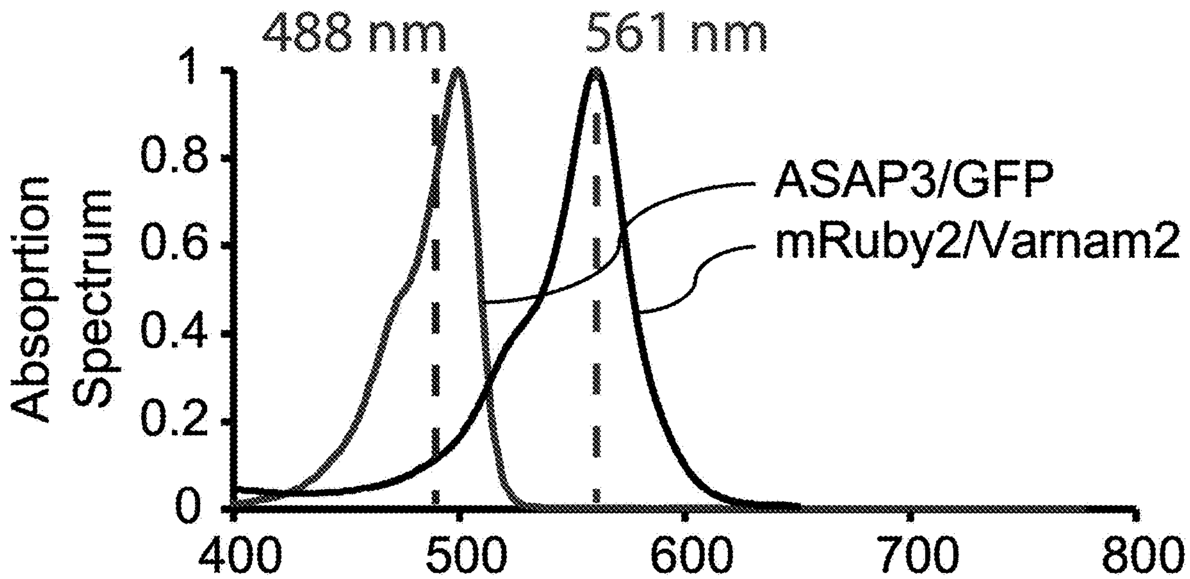
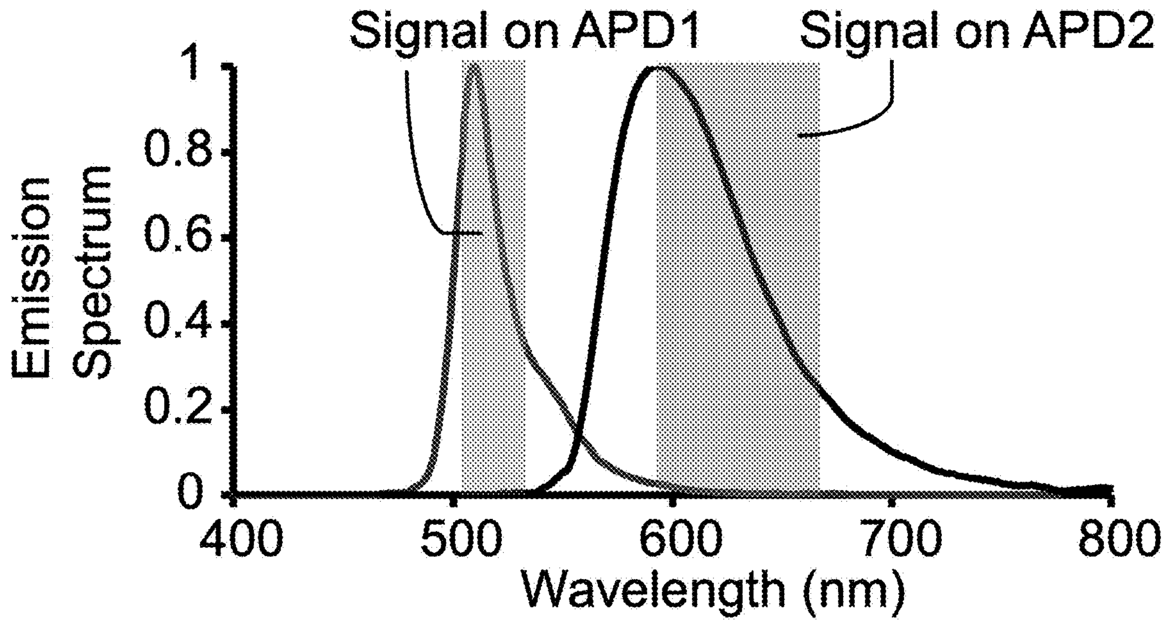
*Fig. 1D*

APPARATUS FOR SENSITIVE FLUORESCENCE OPTICAL MEASUREMENT OF BIOLOGICAL PARAMETERS IN FREELY BEHAVING ANIMALS

CROSS-REFERENCE TO RELATED APPLICATIONS

This application claims priority from U.S. Provisional Patent Application 63/522,044 filed Jun. 20, 2023, which is incorporated herein by reference.

STATEMENT OF FEDERALLY SPONSORED RESEARCH

This invention was made with Government support under contract 1707261 awarded by the National Science Foundation, and under contract NS120822 and NS104590 awarded by the National Institutes of Health. The Government has certain rights in the invention.

FIELD OF THE INVENTION

The present invention relates generally to fiber photometry. More specifically, it relates to devices that facilitate fluorescence measurements of biological parameters in freely behaving animals.

BACKGROUND OF THE INVENTION

Recent strides in bioengineering of genetically encoded fluorescent indicators (GEFI) are now providing biologists with hundreds of spectrally separable fluorescent sensors to monitor, in living animals, a wide range of complex dynamics of biological parameters (e.g., transmembrane voltage of cells, a variety of ions, of neurotransmitters, of neuromodulators, opioids, pH etc.). To significantly advance our understanding of complex biological systems, it is critically important to uncover the precise temporal relationship of physiological processes occurring in living animals.

Fiber photometry, a measurement technique that aggregates fluorescence signal using a fiber optic, is a highly pervasive approach in the field of systems neuroscience to study in vivo brain tissue dynamics during ecologically relevant behavior. To date, more than a thousand laboratories worldwide use this affordable and user-friendly technique daily. Several private companies offer fiber photometry products which drastically lowers the barrier to entry for consumers.

None of the state-of-the art fiber photometry devices are capable of detecting, in real time, changes in optical fluorescent signal that are small (<0.1% dF/F) and fast (<0.01 s) at low fluorescence emission power (a few tens of pW), which represent real-life experimental conditions for almost all fluorescent sensors. Indeed, to the best of our knowledge, most, if not all fiber photometry implementations suffer from the following limitations. First, state-of-the-art technologies have been benchmarked against cytosolic calcium indicators. Those provide extremely high photon flux, due to high event-related rate of change (~100% dF/F) that last for few hundreds of milliseconds, therefore relaxing the engineering constraints on the technological implementation (e.g. noise limit). Unfortunately, biologists will tend to extrapolate their use of the system from experimental configuration that do not safeguard against instrumental and/or biological confounds.

Second, still today, various high-profile publications using fiber photometry do not perform referenced measurements, meaning they do not simultaneously record a fluorescence signal that is insensitive to the biological parameter under investigation. A dominant implementation of fiber photometry system uses incoherent light-emitting diodes (LEDs) as light sources, instead of solid-sate lasers. This is because LEDs are much more affordable than lasers. However, solid-state lasers are generally more stable than LEDs and can be modulated at high frequencies (>50-100 kHz versus <5 kHz for LEDs) at which detectors usually have much lower 1/f read noise than at lower frequencies. By implication, even when LEDs are used for photometry with detectors of near-zero electronic noise, such as a photon-counting photomultiplier tube or a scientific-grade CMOS (sCMOS) camera, the additional illumination noise prevents the system from attaining the low noise floor achievable in principle with lasers. However, while one would prefer using lasers, these coherence light sources suffer from a fundamental constraint of mode-hopping when coupled into a multimode fiber. This instrumental noise will be highly correlated with fiber motion, ubiquitous during animal behavior, thus leading to false biological interpretation of event-related signal change.

Lastly, all fiber photometry systems rely on phase-sensitive detection with low frequency modulation (few kHz), which is often a limitation of either the illimitation source modulation bandwidth and/or the detector bandwidth. All those limitations stifle the field from gaining new and accurate insight into the inner functioning of the brain. For example, high-frequency neural oscillations, integral to various cognitive processes such as attention, motor control, and memory, remain poorly understood due to the inability of current systems to reliably detect these signals in freely behaving animals. To enable accurate biological interpretation, there is a pressing need to innovate new techniques that can mitigate unwanted instrumental and biological artefacts, while enhancing sensitivity and signal fidelity.

SUMMARY OF THE INVENTION

The present invention addresses these limitations by introducing uSMAART (ultra-Sensitive Measurement of Aggregate Activity in Restricted cell-Types), a novel fiber photometry system that employs a laser decoherence technique to prevent speckle noise in the multimode fiber. This innovation significantly enhances the system's sensitivity, enabling the detection of small and fast signal changes in freely behaving animals with high fidelity. The laser decoherence method decouples high-frequency, broadband noise from mouse motion, providing more accurate and reliable measurements of neural dynamics. The uSMAART system outperforms existing fiber photometry technologies by a factor of ten in sensitivity, paving the way for groundbreaking research and applications in neuroscience.

We suppress speckles by actively breaking the illumination's coherence. This strategy is, in part, what makes it possible for our system uSMAART to surpass the sensitivity of not only LED-based fiber photometry systems but also laser-based systems that omit active suppression of speckle noise.

The uSMAART is a fiber optic-based optical sensing technology which is built upon our first-principle guided understanding of various sources of noise. uSMAART has ~10-fold greater sensitivity than prior photometry systems for use in freely moving animals, and, when combined with the best available GEVI for sensing subthreshold voltages, allows a ~100-fold improvement over prior fiber-optic studies of voltage dynamics. uSMAART is universally applicable to any fluorescent reporters, from genetically encoded fluorescent proteins to synthetic dyes and nanoparticles.

uSMAART enables the study of small dynamic variation of one or more biological processes, in the healthy and pathological brain from animal undergoing ecologically relevant behavior. Like prior technologies, uSMAART relies on two key factors: (i) a reference channel that simultaneously tracks artefactual signals, such as from hemodynamics or tissue motion, and (ii) a synchronous detection approach to improve the signal to noise ratio. However, uSMAART outperforms all other fiber photometry implementations in at least one of the three following aspects: (1) stability of illumination source (<0.005 rms noise in % or −120 dB noise floor), (2) immunity to fiber motion-induced illumination artefacts, (3) detection sensitivity in the visible range (−100 dB noise floor).

Optimization of the low noise illumination stage (1)—To achieve −120 dB of noise in the illumination path, we implemented four key components: (1) an ultra-quiet CPU cooling system to control the temperature of the later cavity without transducing deleterious vibration throughout the optical table; (2) a faraday optical isolator (~−60 dB attenuation) to avoid back-reflection of photons into the laser cavity from optical elements; (3) FC/APC 8°-angled fiber launch to deflect reflected photons from the highly reflective fiber optic entrance facet; (4) analogue modulation with a pure sinusoidal 0-5 V signal at tens of kHz, to decrease the 1/f pink noise contribution, inherent to photodetector and lock-in amplifier input noise. This unique modulation scheme warrants careful selection of illumination sources and detectors.

Implementation of laser decoherence (2)—To achieve full decorrelation between signal fluctuation and fiber motion induced by mouse freely moving, we combined an axicon lens, which homogenize photon density and directionality, with a dual static/dynamic diffuser, which will reduce the speckle noise from a laser-based system by dynamically diffusing the laser beam using a circular oscillation of the diffuser in x- and y-direction. The strategy cheaply and efficiently corrects for the unwanted phenomenon of fiber modal noise when coupling a coherent light source into a multi-mode fiber.

Optimization of the low noise detection stage (3)—To achieve high detection fidelity in low-light regime, we carefully selected the best photodetector that fulfilled our needs. High responsivity (25 A/W) optimized for visible photons, high bandwidth (~100 kHz) and low noise equivalent power (2.5 fW/√Hz) made the avalanche photodiode the ideal choice. Moreover, to achieve high photon collection efficiency, we used a fiber coupler with matched NA and anti-reflective coating in the visible range. Additionally, all optical filters have been optimized to capture as much of the fluorescence signal of interest while rejecting as much of the tissue and fiber autofluorescence, inherent to any in vivo fiber photometry approaches. Finally, a consistent overnight fiber photo-bleaching maximizes the detection dynamic range.

In the illustrative embodiment, we harnessed the most challenging genetically encoded fluorescent indicator, namely voltage indicators (GEVI). Among the slew of GEFI, voltage indicators (GEVI) are notoriously the most challenging to use. Indeed, the photon budget per unit time is the lowest of all, largely dominated by the fact that (1) GEVI are membrane localized, thus generating 4 order of magnitude lower fluorescence photons than calcium sensing proteins, (2) transmembrane voltage dynamics are fast, 1-ms-range events, and (3) fluorescence rate of change is one of the smallest (~0.01% signal change per mV of transmembrane potential change). Lastly, GEVI dynamic range is most identical to hemodynamic artefacts (~0.1%), which exist in at least two types: a broad band brain motion and breathing artifacts and narrow band heart-beat artefacts.

Fiber photometry is ubiquitous in systems neuroscience. To date, more than a thousand labs use this cheap and user-friendly technique daily. Dozens of private companies offer this product which drastically lowers the barrier to entry for consumers. Fiber photometry technology has reached its market penetration limit: the number of publications using fiber photometry has plateaued to 700-800 per year. Most, if not all, current companies on this market will likely adopt uSMAART to make it possible for their customers to investigate small dynamic variations of one or more biological processes of their choice, in the healthy and pathological brain.

Although the main market will be systems neuroscience, our technology could penetrate markets where fiber optic-based fluorescence sensing techniques are used (e.g., analytical chemistry). It could also be used to assess the biological process dynamic of patient-derived pluripotent stem cells that recapitulate the full complexity of each patient's genetic background. An additional potential application pertains to drug discovery, as uSMAART will be able to assess the potency of pharmacological compounds on a given biological process, in vitro or in vivo.

The present invention of a fiber-optic-based fluorescence sensing device will serve to monitor a biological parameter in freely moving animals but can also be used in restrained animals. While this device was created for use in mouse, it is readily application to other animals, for example and without limitations, to other rodents, to humans, to invertebrates; or usage in non-animal complex biological systems like tissue culture or organoids. This device enables measurements of a biological parameter from specific, targeted cell-types, which can be, for example and without limitations, anything from neurons, glia, vasculature cells, muscle cells, induced pluripotent stem cells, cardiomyocytes, etc. The biological parameter can be indicative of a biological process of interest such as neural, cellular, or chemical processing. In some other scenarios, the biological parameter can be, without limitation, pH, or concentrations of intracellular or extracellular ions (calcium, chloride, potassium, zinc etc.), concentrations biomolecules, peptides and proteins such as neurotransmitters, hormones, neuro-modulatory peptide or molecules, transcription factors, and intracellular organelle signaling molecules, membrane receptors, the concentration or other properties of synthetic molecules and peptides such as small molecule pharmaceuticals compounds.

The biological parameter of interest is monitored by a "sensor", which in our proof-of-concept was a fluorescent protein that senses the transmembrane voltage of a genetically targeted neuron type. However, it will be appreciated by those skilled in the art that another variety of sensors are available to monitor not only changes in membrane voltage but also a wide range of other biological parameters in vivo (see aforementioned examples). The photons emitted by the sensor can be of different kinds: fluorescence, bioluminescence, organic or inorganic nanoparticles like quantum dots, dyes, among others. In light of this disclosure, it will be within the capabilities of those skilled in the art to utilize our device to sense other biological or chemical molecular processes in any type of biological or non-biological systems.

Those unprecedented capabilities are, in part, due to: Ultra-stable illumination sources (−120 dB noise floor). Immunity to fiber motion artefacts. Low-noise collection system (2.5 fW/√Hz NEP over the relevant visible spectral range). Ultralow noise lock-in input noise (−170 dB or 2.5 nV/√Hz input noise).

In one aspect, the invention provides an apparatus for fiber optic-based fluorescence sensing comprising: a) a laser illumination source adapted to generate light for exciting fluorescence at a modulation frequency of at least 10 kHz, or more preferably at least 100 kHz; with a laser light intensity fluctuation of at least −100 dB noise floor (or 0.01% integrated noise) across DC-200 Hz, or more preferably at least −120 dB (or 0.001%); b) illumination path optical elements coupled to the laser illumination source; wherein the illumination path optical elements comprise: i) an axicon lens to homogenize photon density and directionality, and ii) a dual static/dynamic diffuser to reduce speckle noise by dynamically diffusing the laser beam using a circular oscillation of the diffuser in x-direction and y-direction; c) a flexible optical fiber optically coupled to the illumination path optical elements for propagating the excitation photons and receiving the emission photons from fluorescent proteins; wherein the flexible optical fiber has an autofluorescence signal of less than 10 pW, or more preferably less than 1 pW; d) detection path optical elements optically coupled to the flexible optical fiber; e) a photodetector optically coupled to the detection path optical elements adapted to detect the fluorescence signal at the modulation frequency; and f) a signal processor electrically connected to the photodetector adapted to process signals indicative of the detected fluorescence signal. In preferred implementations, the illumination path optical elements further comprise a faraday isolator followed by an FC/APC fiber launch to prevent photon back-reflection into the laser cavity. In some implementations, the laser illumination source is adapted to generate the light for exciting fluorescence with a laser light intensity fluctuation of at least 0.005% rms noise floor.

BRIEF DESCRIPTION OF THE DRAWINGS

FIG. 1A is a schematic diagram illustrating an apparatus for fiber optic-based fluorescence sensing according to an embodiment of the invention.

FIG. 1B is a schematic diagram illustrating electronics for phase-sensitive frequency demodulation according to an embodiment of the invention.

FIG. 1C is a graph of absorption vs. wavelength showing the absorption spectra for two fluorophores, according to an embodiment of the invention.

FIG. 1D is a graph of emission vs. wavelength showing the emission spectra for two fluorophores, according to an embodiment of the invention.

DETAILED DESCRIPTION OF THE INVENTION

To capture high-frequency oscillations up to ~100 Hz in freely moving mammals, embodiments of the present invention provide an ultra-sensitive fiber photometry system (uSMAART). Prior fiber systems have been unable to capture optical voltage traces revealing high-frequency neural oscillations in freely behaving mice. This is challenging, because (i) fiber photometry measurements from GEVIs usually involve very weak fluorescence signals (~50-250 pW), (ii) neural oscillations at higher frequencies afford fewer GEVI signal photons per oscillation cycle, (iii) GEVIs alter their emissions by only ~0.1-1% per mV of voltage change, (iv) hemodynamics and tissue motion often induce artifactual signals of this magnitude or greater, and (v) fiber-optic apparatus typically have multiple noise sources, including light sources, photodetectors, amplifiers and fiber autofluorescence.

Our own past work on fiber-optic TEMPO came nearest to the landmark achieved here but fell short in key respects. Specifically, our studies of high-frequency oscillations used head-fixed mice and averages over hundreds of trials to attain statistical conclusions. A follow-up study, which also involved substantial trial-averaging, used freely behaving mice but was confined to quantifications of cross-hemisphere gamma-band synchronization across a pair of fiber-optic probes, rather than capturing high-frequency voltage dynamics in unaveraged traces. To surpass this past work, we examined our prior TEMPO instrumentation and datasets with the goal of minimizing noise fluctuations by identifying and reducing the remnant noise sources.

We found that optical mode-hopping in the fiber conveying laser light to the brain was the main limiting noise source in our earlier studies and arose selectively during unconstrained animal locomotion and thus also motion of the fiber. Mode-hopping is a type of speckle noise occurring when coherent laser light propagates in multimode fiber, due to fluctuating interference between light in different modes when the fiber flexes. To prevent speckle, one might consider incoherent light-emitting diodes (LEDs) as alternative light sources. But solid-state lasers are generally more stable than LEDs and can be modulated at high frequencies (~50-100 kHz) at which detectors usually have much lower noise than at lower frequencies (e.g. ~5 kHz for LEDs). Thus, we retained lasers in our new system, uSMAART, but suppressed speckle by actively breaking the illumination's coherence. Overall, uSMAART has 4 modules, all designed to minimize noise: (i) low-noise lasers with near-stationary emission power; (ii) a decoherence module to preclude mode-hopping noise; (iii) a high-efficiency fluorescence sensing module; (iv) digital lock-in amplifiers for phase-sensitive detection of fluorescence signals.

Figure 1E:
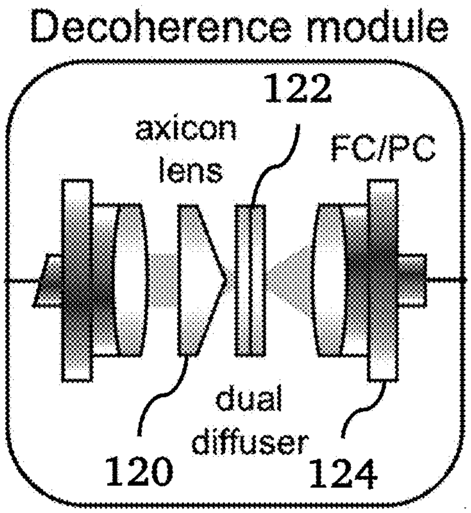
FIG. 1E is a schematic diagram illustrating a decoherence module according to an embodiment of the invention.

FIG. 1A is a schematic diagram illustrating an apparatus for fiber optic-based fluorescence sensing according to an embodiment of the invention. A low-noise illumination module 100 includes a laser illumination source adapted to generate light for exciting fluorescence at a modulation frequency of at least 10 kHz, or more preferably at least 100 kHz; with a laser light intensity fluctuation of at least −100 dB noise floor (or 0.01% integrated noise) across DC-200 Hz, or more preferably at least −120 dB (or 0.001%). A decoherence module 104 coupled to the low-noise illumination module 100 via optical fiber 102 has illumination path optical elements that transmit the light. As detailed in FIG. 1E, the decoherence module including an axicon lens 120 to homogenize photon density and directionality, a dual static/dynamic diffuser 122 to reduce speckle noise by dynamically diffusing the laser beam using a circular oscillation of the diffuser in x-direction and y-direction, and an FC/PC (physical contact fiber connector) 124. Returning to FIG. 1A, the decoherence module 104 is coupled via an optical fiber 106 to a low-noise fluorescence sensing module 108 that transmits the illumination light into a mandrel wrap 110 flexible optical fiber for propagating the excitation photons through LFP channel 112 via coupling 114 into an animal 116 such as a mouse. The flexible optical fiber 110 also receives the emission photons from fluorescent proteins excited by the illumination light and transmits the emission light back to the low-noise fluorescence sensing module 108. The flexible optical fiber 110 has an autofluorescence signal of less than 10 pW, or more preferably less than 1 pW. The low-noise fluorescence sensing module 108 includes detection path optical elements, and a photodetector adapted to detect the fluorescence signal at the modulation frequency. A signal processor is electrically connected to the photodetector and is adapted to process signals indicative of the detected fluorescence signal.

Illumination Module

Figure 1F:
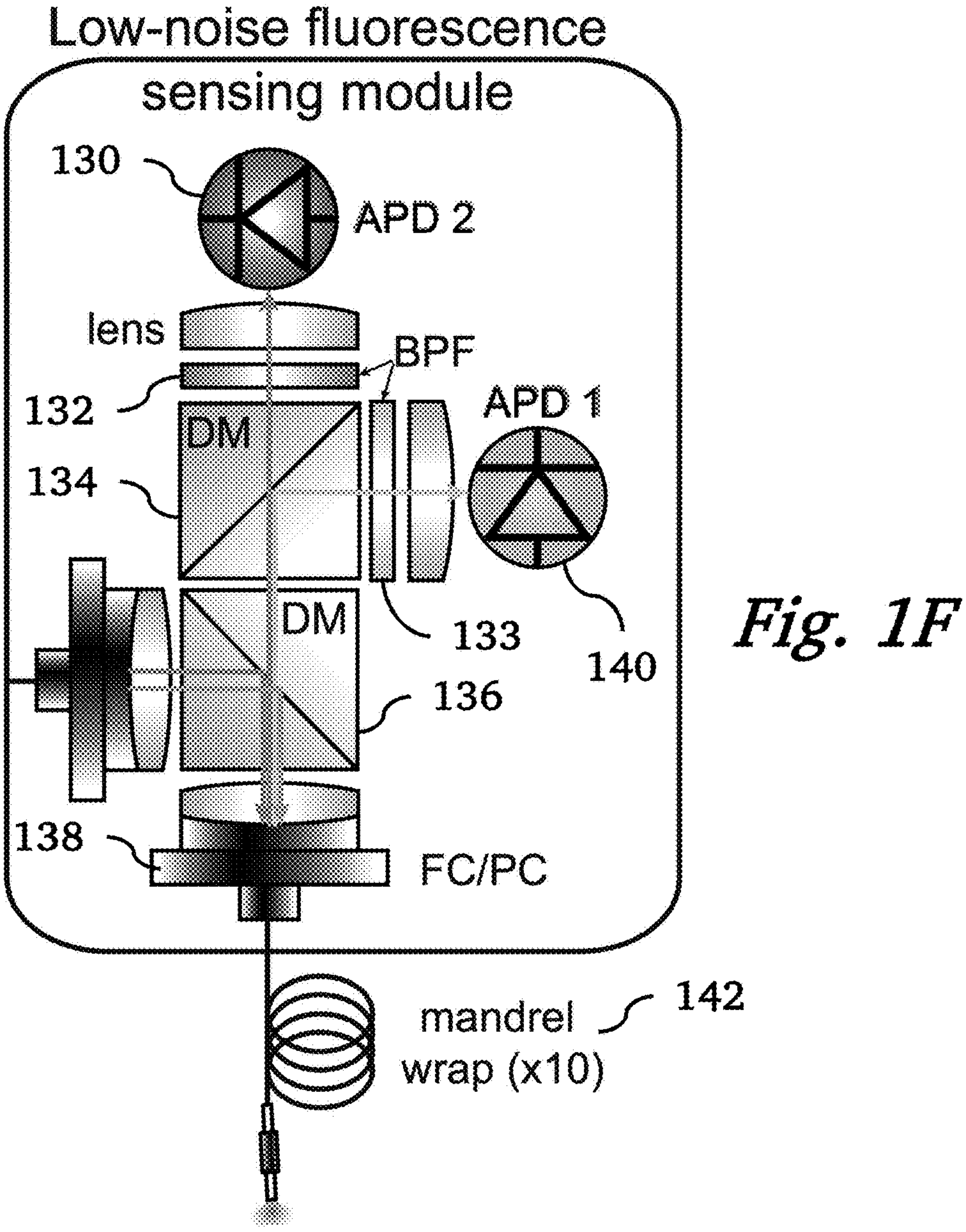
FIG. 1F is a schematic diagram illustrating a low-noise fluorescence sensing module according to an embodiment of the invention.
Figure 1G:
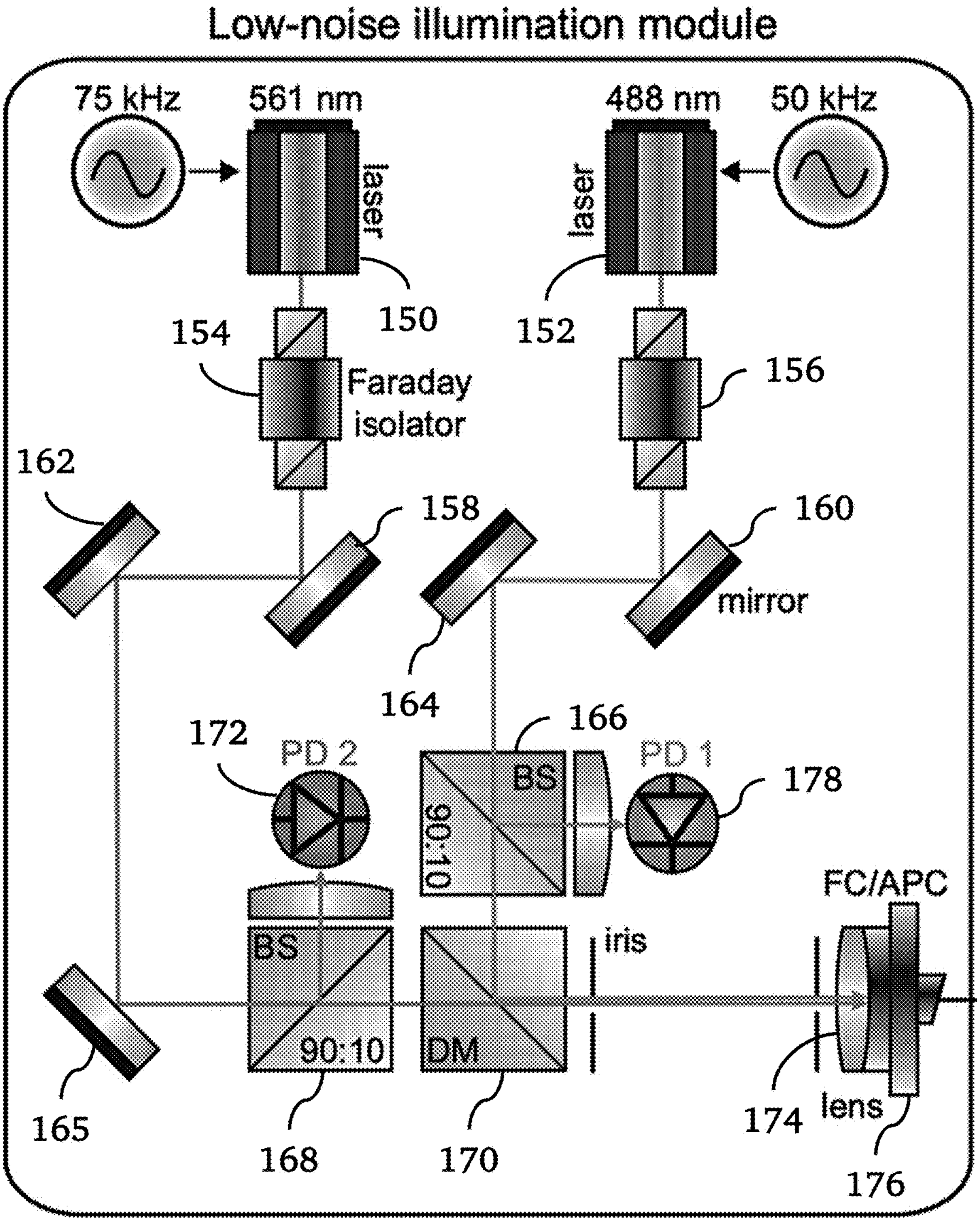
FIG. 1G is a schematic diagram illustrating a low-noise illumination module, according to an embodiment of the invention.

FIG. 1G details the low-noise illumination module 100, which includes the illumination path optical elements. Blue and green lasers 150, 152 are modulated at distinct frequencies (50 and 75 kHz, respectively) to generate excitation light signals which pass through Faraday isolators 154, 156, respectively. These signals are then directed by mirrors 158, 162, 165 and 160, 164, respectively, into 90:10 beam splitters (BS) 168, 166, respectively, so that a portion of the light signals from each laser 150,152 is split from the main pathway and monitored with a photodiode (PD), 172, 178, respectively. The main portions of the light signals are combined in dichroic mirror (DM) 170 to form a combined beam that is directed through a lens 174 and angled physical contact fiber connector (FC/APC) fiber launch 176 to prevent photon back-reflection into the laser cavity.

The laser illumination module is ~10-fold more stable than that of prior photometry systems. Lasers can exhibit output instability if emitted photons reflect back into the laser cavity; thus, we took care to prevent back-reflections. To collect signals at modulation frequencies at which lasers and detectors have reduced instrumentation (1/f) noise, we modulated our lasers at 50 or 75 kHz.

To achieve stable illumination (<0.005% rms noise fluctuation), we selected solid-state laser sources, instead of light-emitting diodes (LEDs), since the former generally have ~10-fold lower noise levels than the latter. Further, commercial solid-state lasers commonly have an analog modulation bandwidth that extends to the ~100 kHz range, much beyond the modulation bandwidths of typical LEDs, and the use of 50-75 kHz modulation frequencies allowed us to perform measurements in a part of the frequency spectrum where electronic instrumentation noise is much reduced. We used a purely sinusoidal analogue modulation scheme to ensure that no spectral harmonics propagated to adjacent recording channels. However, to attain low-noise illumination from a laser source, it is important to minimize optical back-reflections into the laser cavity, which can lead to emission instability. To prevent back-reflections, we placed a Faraday isolator (−40 dB attenuation) immediately succeeding each laser source in its illumination pathway. Given these considerations, we used continuous wave laser light sources with 488 nm and 561 nm wavelengths (488-20LS and 561-50LS OBIS Lasers, Coherent) to excite green and red fluorescence, respectively. We used a fixed free-space Faraday isolator (10-3-488-HP, Thorlabs) and a tunable free-space isolator (FI-500/820-5SV, Linos) to prevent back-reflections into the two respective laser cavities. To further reduce back-reflections, we coupled all laser beams into an 8°-angled fiber-optic patch-cord (FC/APC).

To align the polarization of the 561-nm-emissions with the polarization axis of the accompanying isolator, we aligned an achromatic half-wave plate (AHWP05M-600, Thorlabs) in front of the isolator's entrance face. We aligned the two laser beams onto a common optical path using steering mirrors (BB1-E02, Thorlabs) and iris diaphragms (CP20D, Thorlabs). To direct 10% of the light from each laser beam to a photodiode (PDA100A. Thorlabs) for continuous monitoring of the emission power, we used a pair of 90/10 beamsplitters (BS028, Thorlabs). We combined the other 90% of the light power from each of the two beams using a dichroic mirror (FF511-Di01, Semrock). We coupled the pair of collimated beams into a multi-mode, 8°-angled fiber (105 μm core, 0.2 NA; FG105LCA, Thorlabs) with an FC/APC fiber collimator (F240APC-532, Thorlabs).

Decoherence Module

The excitation light from the low-noise illumination module of FIG. 1G enters the decoherence module 104, whose components are detailed in FIG. 1E. The illumination light passes through an axicon lens 120, then, to achieve immunity to fiber motion artifacts, the light passes through a free-space, dual-stage optical diffuser 122 and is then coupled back into optical fiber via a physical contact fiber connector (FC/PC) 124.

The decoherence module (FIG. 1E) breaks the coherence between light in different spatial modes, rendering the illumination pattern and power impervious to fiber motion.

To prevent optical mode-hopping fluctuations (a form of optical speckle) that can arise due to motion of a multimode optical fiber, we sought to reduce the coherence of the laser illumination. To this end, we built a dual-stage optical diffuser, the second stage of which is dynamic and reduces the spatial coherence of the beam by inducing rapid variations of the optical path length across each beam's spatial cross-section. Within the decoherence module, after exiting the FC/APC optical fiber, each laser beam passes through an axicon lens, which converts each beam's Gaussian cross-sectional profile to a flat-top intensity profile. This increases the number of micron-scale grains within the diffuser that interact with and scatter the laser light.

To implement this approach, we first collimated the laser light exiting the FC/APC fiber module using a fiber-optic collimator (F240APC-532; Thorlabs). Next, we positioned onto the light path a Ø1" plano-convex ring grade axicon lens (140° apex angle; #83-790, Edmund optics). The axicon focused each beam onto the dual static-dynamic diffuser (LSR-3005-24D-VIS, Optotune), which had an average grain size of 3 μm. The second diffuser in the pair circularly oscillated at 300 Hz in the two lateral dimensions orthogonal to the longitudinal optical axis, actuated by four independent electro-active polymer electrodes. To collimate the diffused laser light, we used an aspheric lens (A240TM-A, f=8.00 mm, NA=0.5, Thorlabs). Finally, to maximize the photon collection efficiency, we coupled the beams into a FC/PC multimode fiber Ø1000 μm/0.39 NA (FP1000U RT, Thorlabs) using a fiber collimator (F240PC-532, Thorlabs). To enable concurrent recordings in two brain areas, we coupled the illumination into a FC/PC bifurcated multimode fiber bundle, Ø400 μm/0.39 NA, (BFY400HF2, Thorlabs), using a FC/PC to FC/PC mating sleeve (ADAFC2, Thorlabs).

Sensing Module

A low-noise fluorescence sensing module, detailed in FIG. 1F, achieves high-efficiency, low-noise fluorescence detection using a pair of avalanche photodiodes (APDs) 130, 140 and a combination of dichroic mirrors (DMs) 134, 136 and bandpass filters (BPFs) 132, 133 that minimize crosstalk between fluorescence channels. A dichroic mirror (DM) 136 allows the excitation light to pass through the module, while directing the sensed fluorescence light to the detectors 130, 140. The light to and from the animal brain is coupled via an optical fiber 110 (FIG. 1A) via a physical contact fiber connector (FC/PC) 138.

The sensing module (FIG. 1F) maximizes fluorescence signals while minimizing noise. For detectors, we chose avalanche photodiodes as their high photoelectron responsivity (50 V/A for 500-650 nm) and low noise (2 fW/√Hz) noise-equivalent power) up to 100 kHz maximize the signal-to-noise levels of fluorescence detection.

To maximize collection of the fluorescence signals while minimizing spectral cross-talk and bleedthrough, we quantitatively evaluated and selected fluorescent filters based on the spectral properties of all fluorophores used in our experiments. To maximize our measurement SNR, we selected a photodetector with a noise-equivalent power as low as 2 pW/√Hz and a signal detection bandwidth wide enough to accommodate the two lasers' high analogue modulation frequencies (50 kHz and 75 kHz). To minimize fiber autofluorescence, we photobleached the fiber conveying light to and from the brain at least 1 day before each experiment using the same illumination wavelengths, yielding a ~5-10-fold reduction in autofluorescence (~1-10 pW residual fiber fluorescence induced by ~100 pW of 488 nm illumination). We removed residual light in the cladding modes of the fiber delivering light to and from the brain by winding the fiber around a 10× mandrel wrap 142 (FIG. 1F).

In our implementation of this approach, the fluorescence collection pathway had two spectral detection channels, and a single-band dichroic mirror and two bandpass filters to separate and steer green and red signals to separate photodetectors. The excitation laser beams from one branch of the bifurcated multimode fiber bundle were collimated using a fiber collimator (F240PC-532, Thorlabs), reflected off a dual-edge dichroic mirror (Di01-R488/561, Semrock), and focused into a multimode, low autofluorescence, pre-photobleached, fiber-optic patch cord (1.5-m-long, Ø400 μm-core, 0.50 NA; FT400URT, Thorlabs) using a fiber collimator (F240PC-532, Thorlabs). The patch cord fiber was tightly wrapped ten times around a Ø1" pedestal post (RS3P8E, Thorlabs), placed just after the fiber collimator. Using a ceramic mating sleeve (ADAF1, Thorlabs), we connected the patch cord to an optical fiber (CFM14L05, Thorlabs) that we implanted in the mouse brain. The total mean power delivered to the brain was 25-200 μW. Fluorescence emissions from the brain passed through the dual-edge dichroic mirror and were split into red and green channels using a single-edge dichroic mirror (FF562-Di01, Semrock). Light in each channel passed through a bandpass filter (FF01-520/28 or FF01-630/92, Semrock) and was focused onto an avalanche photodiode (APD) (APD440A2, Thorlabs) by an aspheric lens (A240TM-A, f=8.00 mm, NA=0.5, Thorlabs).

For all experiments, we used a pair of lock-in amplifiers (LIA) (MFLI-MD, Zurich Instruments), one for each illumination path. Each LIA provides one analog modulation signal and can demodulate up to 4 signals. We amplitude-modulated the 488 nm and 561 nm lasers with analogue sinusoidal oscillations at 75 kHz and 50 kHz respectively, with 0 V to 4V peak-to-peak amplitudes. We used one LIA to demodulate signals from the photodiode measuring 488 nm laser power fluctuations and from the APD measuring green fluorescence signals. We used the other LIA to demodulate signals from the photodiode measuring 561 nm laser power fluctuations and from the APD detecting the red fluorescence. Signals were demodulated using a linear-phase finite impulse response (FIR) filter, which is specifically designed for digital signal processing applications and allows low-pass filtering of signals with a frequency range that depends on the demodulation frequency. The low-pass filter used for demodulation was set to have a 0.1 ms time-constant and 48 dB/octave roll-off, enabling a measurement bandwidth of 0-500 Hz.

Flexible Fiber

To attenuate noise from spatial mode-hopping, the fiber 110 (FIG. 1A), 142 (FIG. 1F) conveying light to and from the brain is wrapped ten times around a mandrel. This wrapping quenches the high-order cladding modes, which decreases fluctuations in both the illumination and the collected fluorescence photons noise. FIG. 1B is a schematic diagram illustrating electronics for phase-sensitive frequency demodulation. The electronics are connected to the sensing module and function to isolate signals conveying the illumination and fluorescence emission powers. FIGS. 1C, 1D show absorption and emission fluorescence spectra for single cell-type voltage-sensing configurations, for which a red-photon emitting fluorescent indicator is used as the reference fluorophores (here mRuby2 as an example). The reversed configuration is possible, which combine a red voltage sensor with a green reference fluorophore (e.g. Varnam2 with GFP)

It will be appreciated by those skilled in the art that, in some other embodiments, different type of sensors can be used to monitor the same or different biological parameters. Similarly, different reference fluorescent proteins that are insensitive to the biological parameter under investigation can be used to monitor the same or different artifacts.

To deliver light to and from the brain, we chose an optical fiber 110 (FIG. 1A) of low intrinsic autofluorescence. Minimizing autofluorescence is vital, as otherwise it will diminish a detector's effective dynamic range; further, autofluorescence photon shot noise can mask the weak signals associated with high-frequency voltage dynamics. Thus, we photobleached the fiber prior to experimentation to further reduce autofluorescence (~1-10 pW residual fluorescence with ~100 pW illumination). Low-noise, digital lock-in amplifiers allowed us to demodulate the fluorescence signals from the photodetector outputs 130, 140, 172, 178 in FIGS. 1F, 1G.

To evaluate uSMAART against prior photometry apparatus, we generated artificial 50 Hz signal bursts using a movable fluorescent sample and verified that uSMAART boosts sensitivity about ten-fold. Further, for all uSMAART studies in the live brain, we took LFP recordings at the same tissue sites to support our interpretations of the optical traces. We stipulated that, as in our prior studies of low-frequency rhythms, all high-frequency optical voltage events should be accompanied by a coherent rise in LFP signals in the same frequency band, not just by a concomitant rise in high-frequency LFP power over the event time-course. This criterion might, in principle, lead one to overlook optical voltage signals that are incoherent with the LFP, but ensuring a rise in phase coherence between the two modalities affords additional confidence in the tiny optical signals arising from high-frequency events.

The invention claimed is:

1. An apparatus for fiber optic-based fluorescence sensing comprising:

a) a laser illumination source adapted to generate light for exciting fluorescence at a modulation frequency of at least 10 kHz with a laser light intensity fluctuation of at least −100 dB noise floor across DC-200 Hz;

b) illumination path optical elements coupled to the laser illumination source, wherein the illumination path optical elements comprise:

i) an axicon lens adapted to homogenize photon density and directionality, and ii) a dual static and dynamic diffuser adapted to reduce speckle noise by dynamically diffusing the laser beam via circular oscillation of a dynamic stage of the dual static and dynamic diffuser in two lateral dimensions orthogonal to a longitudinal optical axis;

c) a flexible optical fiber optically coupled to the illumination path optical elements for propagating the excitation photons and receiving the emission photons from fluorescent proteins;

d) detection path optical elements optically coupled to the flexible optical fiber;

e) a photodetector optically coupled to the detection path optical elements adapted to detect the fluorescence signal at the modulation frequency; and f) a signal processor electrically connected to the photodetector adapted to process signals indicative of the detected fluorescence signals.

2. The apparatus of claim 1 wherein the laser illumination source is adapted to generate the light for exciting fluorescence at a modulation frequency of at least 10 kHz.

3. The apparatus of claim 1 wherein the illumination path optical elements further comprise iii) a faraday isolator coupled between the laser illumination source and the illumination path optical elements to prevent photon back-reflection into a cavity of the laser followed by iv) an FC/APC fiber launch to prevent photon back-reflection into the laser cavity.

4. The apparatus of claim 1 wherein the laser illumination source is adapted to generate the light for exciting fluorescence with a laser light intensity fluctuation of at least 0.005% rms noise floor.

5. The apparatus of claim 1 wherein the flexible optical fiber has an autofluorescence signal of less than 10 pW.

* * * * *